United States Patent [19]
Goedegebuur et al.

[11] Patent Number: 5,871,550
[45] Date of Patent: Feb. 16, 1999

[54] MUTANT THERMONOSPORA SPP. CELLULASE

[75] Inventors: Frits Goedegebuur, Vloordingen, Netherlands; Scott D. Power, San Bruno, Calif.; Deborah Winetzky, Foster City, Calif.; Anita Van Kimmenade, San Bruno, Calif.; Mee-Young Yoon, Palo Alto, Calif.

[73] Assignee: Genencor International, Inc., Rochester, N.Y.

[21] Appl. No.: 924,440

[22] Filed: Aug. 26, 1997

[51] Int. Cl.$^6$ .............................. C11D 3/386; D06B 1/00; A23B 7/155
[52] U.S. Cl. .............................. 8/137; 439/69.1; 439/209; 439/263; 510/293; 510/393; 510/320; 510/530; 426/52; 426/53
[58] Field of Search .................................. 435/69.1, 209, 435/263; 510/392, 393, 320, 530; 8/137; 426/52, 53

[56] References Cited

U.S. PATENT DOCUMENTS

| | | | |
|---|---|---|---|
| 5,192,677 | 3/1993 | Kinsella et al. | 435/220 |
| 5,536,655 | 7/1996 | Thomas et al. | 435/209 |
| 5,705,379 | 1/1998 | Wilson et al. | 435/220 |
| 5,759,840 | 6/1998 | Sung et al. | 435/200 |

OTHER PUBLICATIONS

Lao, et al "DNA Sequences of Three β–1,4–Endoglucanases Genes from *Thermomonaspora Fusca*" *Journal of Bacteriology*, vol. 173 No. 11 pp. 3397–3407 (1991.

Primary Examiner—Kery Fries
Attorney, Agent, or Firm—Christopher L. Stone

[57] ABSTRACT

A mutant cellulase obtainable from Thermomonospora spp is provided which differs from a precursor cellulase in that it has been genetically engineered to introduce a substitution, deletion or addition of an amino acid residue to said precursor cellulase which provided improved activity in a detergent. Preferably, the substitution is at a residue corresponding to T140 in *Thermomonospora fusca*.

11 Claims, 4 Drawing Sheets

```
                10                      30
GCCGGTCTCACCGCCACAGTCACCAAAGAATCCTCGTGGGACAACGGC
 A  G  L  T  A  T  V  T  K  E  S  S  W  D  N  G 50                70                     90
TACTCCGCGTCCGTCACCGTCCGCAACGACACCTCGAGCACCGTCTCC
 Y  S  A  S  V  T  V  R  N  D  T  S  S  T  V  S 110                    130
CAGTGGGAGGTCGTCCTCACCCTGCCCGGCGGCACTACAGTGGCCCAG
 Q  W  E  V  V  L  T  L  P  G  G  T  T  V  A  Q 150                170                      190
GTGTGGAACGCCCAGCACACCAGCAGCGGCAACTCCCACACCTTCACC
 V  W  N  A  Q  H  T  S  S  G  N  S  H  T  F  T 210                     230
GGGGTTTCCTGGAACAGCACCATCCCGCCCGGAGGCACCGCCTCCTTC
 G  V  S  W  N  S  T  I  P  P  G  G  T  A  S  F 250                    270              2
GGCTTCATCGCTTCCGGCAGCGGCGAACCCACCCACTGCACCATCAAC
 G  F  I  A  S  G  S  G  E  P  T  H  C  T  I  N 90                     310                     330
GGCGCCCCCTGCGACGAAGGCTCCGAGCCGGGCGGCCCCGGCGGTCCC
 G  A  P  C  D  E  G  S  E  P  G  G  P  G  G  P 350                    370
GGAACCCCCTCCCCCGACCCCGGCACGCAGCCCGGCACCGGCACCCCG
 G  T  P  S  P  D  P  G  T  Q  P  G  T  G  T  P 390                 410                  430
GTCGAGCGGTACGGCAAAGTCCAGGTCTGCGGCATCCAGCTCTGCGAC
 V  E  R  Y  G  K  V  Q  V  C  G  I  Q  L  C  D 450                 470
GAGCACGGCAACCCGGTCCAACTGCGCGGCATGAGCACCCACGGCATC
 E  H  G  N  P  V  Q  L  R  G  M  S  T  H  G  I
```

FIG._1A

```
        490                 510                     5
CAGTGGTTCGACCACTGCCTGACCGACAGCTCGCTGGACGCCCTGGCC
 Q   W   F   D   H   C   L   T   D   S   S   L   D   A   L   A 30                 550                     570
TACGACTGGAAGGCCGACATCATCCGCCTGTCCATGTACATCCAGGAA
 Y   D   W   K   A   D   I   I   R   L   S   M   Y   I   Q   E 590                 610
GACGGCTACGAGACCAACCCGCGCGGCTTCACCGACCGGATGCACCAG
 D   G   Y   E   T   N   P   R   G   F   T   D   R   M   H   Q 630                 650                 670
CTCATCGACATGGCCACGGCGCGCGGCCTGTACGTGATCGTGGACTGG
 L   I   D   M   A   T   A   R   G   L   Y   V   I   V   D   W 690                 710
CACATCCTCACCCCGGGCGATCCCCACTACAACCTGGACCGGGCCAAG
 H   I   L   T   P   G   D   P   H   Y   N   L   D   R   A   K 730                 750                     7
ACCTTCTTCGCGGAAATCGCCCAGCGCCACGCCAGCAAGACCAACGTG
 T   F   F   A   E   I   A   Q   R   H   A   S   K   T   N   V 70                 790                 810
CTCTACGAGATCGCCAACGAACCCAACGGAGTGAGCTGGGCCTCCATC
 L   Y   E   I   A   N   E   P   N   G   V   S   W   A   S   I 830                 850
AAGAGCTACGCCGAAGAGGTCATCCCGGTGATCCGCCAGCGCGACCCC
 K   S   Y   A   E   E   V   I   P   V   I   R   Q   R   D   P 870                 890                 910
GACTCGGTGATCATCGTGGGCACCCGCGGCTGGTCGTCGCTCGGCGTC
 D   S   V   I   I   V   G   T   R   G   W   S   S   L   G   V 930                 950
TCCGAAGGCTCCGGCCCCGCCGAGATCGCGGCCAACCCGGTCAACGCC
 S   E   G   S   G   P   A   E   I   A   A   N   P   V   N   A
```

FIG._1B

```
         970                   990                       10
TCCAACATCATGTACGCCTTCCACTTCTACGCGGCCTCGCACCGCGAC
 S   N   I   M   Y   A   F   H   F   Y   A   A   S   H   R   D 10                  1030                    1050
AACTACCTCAACGCGCTGCGTGAGGCCTCCGAGCTGTTCCCGGTCTTC
 N   Y   L   N   A   L   R   E   A   S   E   L   F   P   V   F 1070                   1090
GTCACCGAGTTCGGCACCGAGACCTACACCGGTGACGGCGCCAACGAC
 V   T   E   F   G   T   E   T   Y   T   G   D   G   A   N   D 1110                   1130                    1150
TTCCAGATGGCCGACCGCTACATCGACCTGATGGCGGAACGGAAGATC
 F   Q   M   A   D   R   Y   I   D   L   M   A   E   R   K   I 1170                   1190
GGGTGGACCAAGTGGAACTACTCGGACGACTTCCGTTCCGGCGCGGTC
 G   W   T   K   W   N   Y   S   D   D   F   R   S   G   A   V 1210                   1230                    12
TTCCAGCCGGGCACCTGCGCGTCCGGCGGCCCGTGGAGCGGTTCGTCG
 F   Q   P   G   T   C   A   S   G   G   P   W   S   G   S   S 50                  1270                    1290
CTGAAGGCGTCCGGACAGTGGGTGCGGAGCAAGCTCCAGTCCTGA
 L   K   A   S   G   Q   W   V   R   S   K   L   Q   S   *
```

FIG._1C

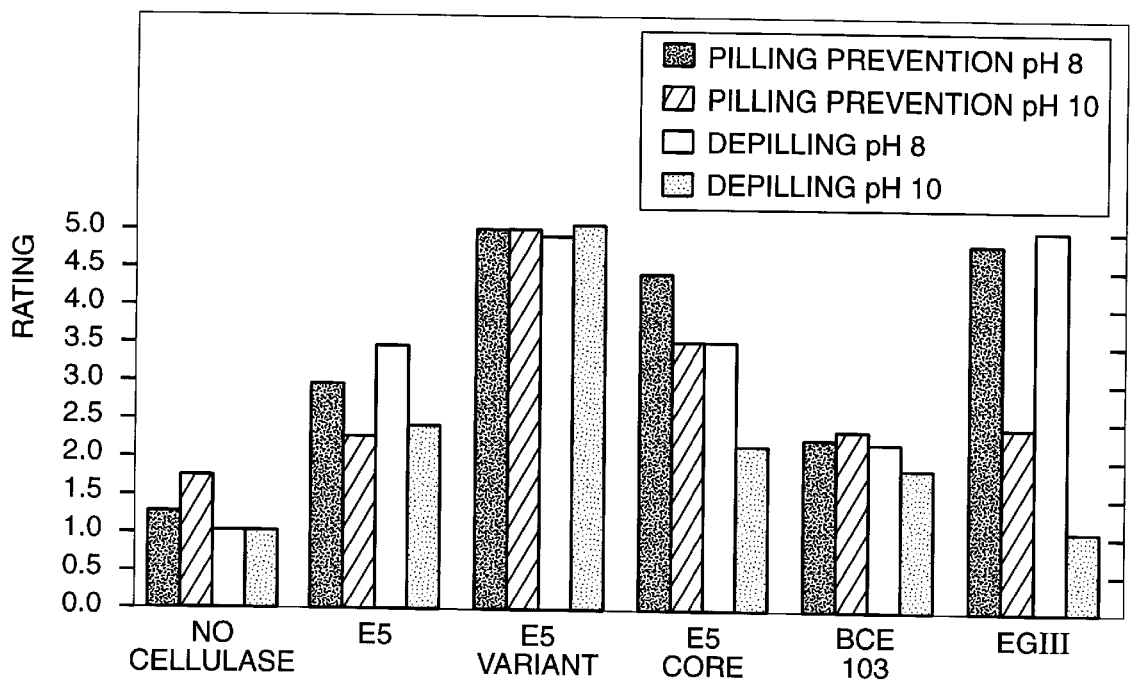
FIG._2
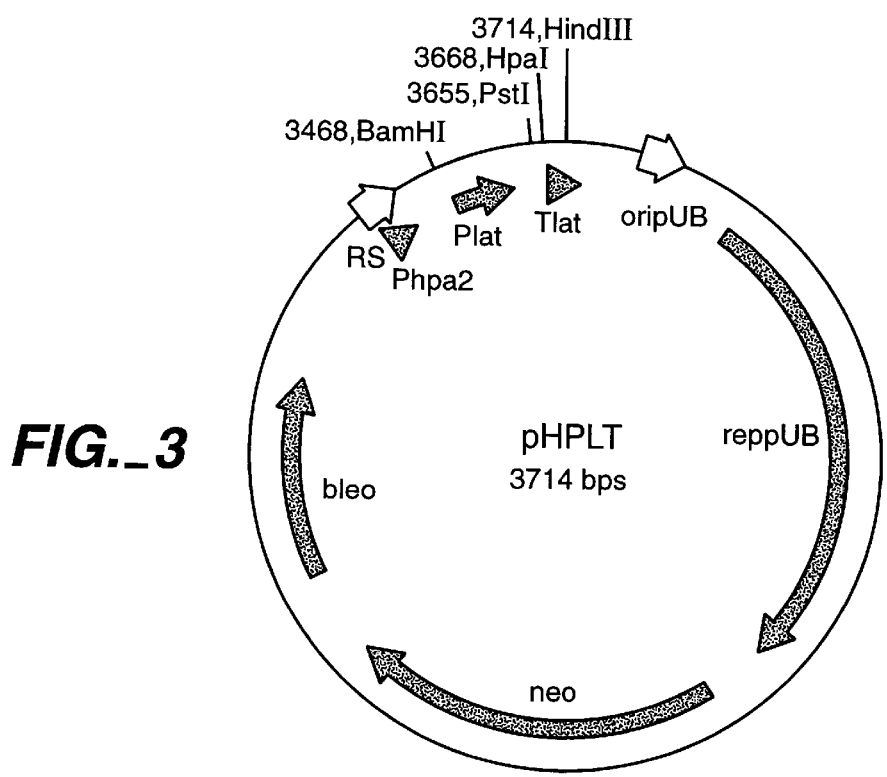
FIG._3

5,871,550

MUTANT THERMONOSPORA SPP. CELLULASE

BACKGROUND OF THE INVENTION

The present invention is directed to novel cellulase compositions and methods of use therefor in industrial processes. In particular, the present invention is related to treating textiles, e.g., laundering and processing, with a mutant cellulase derived from Thermomonospora spp. The present invention is further related to the use of cellulase derived from Thermomonospora spp. to enhance the digestibility of animal feed, in detergents, in the treatment of pulp and paper and in the production of starch and treatment of by-products thereof.

Cellulases are enzymes which hydrolyze cellulose (β-1, 4-D-glucan linkages) and produce as primary products glucose, cellobiose and cellooligosaccharides. Cellulases are produced by a number of microorganisms and comprise several different enzyme classifications including those identified as exo-cellobiohydrolases (CBH), endoglucanases (EG) and β-glucosidases (BG) (M. Schulein, *Methods in Enzymology*, Vol. 160, pp. 235–242 (1988)). Current theory holds that the enzymes within these classifications can be separated into individual components. For example, microbial cellulase compositions may consist of one or more CBH components, one or more EG components and possibly β-glucosidase. The complete cellulase system comprising CBH, EG and BG components synergistically act to convert crystalline cellulose to glucose. The exo-cellobiohydrolases and the endoglucanases act together to hydrolyze cellulose to small cello-oligosaccharides. The oligosaccharides (mainly cellobioses) are subsequently hydrolyzed to glucose by a major β-glucosidase.

Cellulases and components thereof, used either singularly or in combination, are known to be useful in detergent compositions and for treating textiles. In the textile industry, during or shortly after the manufacture of cotton-containing fabrics, it is known to treat such fabrics with cellulase to impart desirable properties to the fabric. One purpose of this treatment is to remove fuzz, i.e., untangled fiber ends that protrude from the surface of a yarn or fabric, and pills, i.e., bunches or balls of tangled fibers that are held to the surface of a fabric by one or more fibers. Accordingly, in the textile industry, cellulase has been used to improve the feel and/or appearance of cotton-containing fabrics, to remove surface fibers from cotton-containing knits, and also for imparting a stone washed appearance to cotton-containing denims. In particular, Japanese Patent Application Nos. 58-36217 and 58-54032 as well as Ohishi et al., "Reformation of Cotton Fabric by Cellulase" and "What's New—Weight Loss Treatment to Soften the Touch of Cotton Fabric", *Japan Textile News*, (Dec. 1988) each disclose that treatment of cotton-containing fabrics with cellulase results in an improved feel for the fabric. It is generally believed that this cellulase treatment removes cotton fuzzing and/or surface fibers which reduces the weight of the fabric. The combination of these effects imparts improved feel to the fabric.

Clothing made from cellulose fabric, such as cotton denim, is stiff in texture due to the presence of sizing compositions used to ease manufacturing, handling and assembling of clothing items and typically has a fresh dark dyed appearance. One desirable characteristic of indigo-dyed denim cloth is the alteration of dyed threads with white threads, which gives denim a white on blue appearance. For example, after a period of extended wear and laundering, the clothing items, particularly denim, can develop in the panels and seams localized areas of variation in the form of a lightening in the depth or density of color. In addition, a general fading of the clothes, some pucker in seams and some wrinkling in the fabric panels can often appear. In recent years such a distressed or "stonewashed" look, particularly in denim clothing, has become very desirable to a substantial proportion of the public. In addition to textile processing, cellulases are also known to be useful as animal feed additives, in the processing of pulp and paper and in the reduction of biomass.

A cellulase system derived from the thermophilic, filamentous, soil bacterium *Thermomonospora fusca* has been detected and the biochemical characteristics of that system and components thereof studied (Wilson, *Critical Reviews in Biotechnology*, Vol. 12½, pp. 45–63 (1992)). One specific endoglucanase component of the *T. fusca* system, E5, has been sequenced (Lao et al., *J. Bacter.*, Vol. 173, pp. 3397–3407 (1991)), and its disulfide arrangement and functional domains described (McGinnis et al., *Biochemistry*, Vol. 32, pp. 8157–8161 (1993)). McGinnis discloses that E5 treated with protease from *Streptomyces lividans* results in a 14 kD cellulose binding domain and a catalytically active 32 kD fragment which had lost the ability to bind to cellulose. Pure catalytically active *S. lividans* protease treated E5 was shown to have similar activity to intact enzyme on CMC. However, mixtures of catalytically active E5 fragments, when combined with intact E3 from *T. fusca* or intact E3 and CBHI from *Trichoderma reesei*, showed decreased performance to similar mixtures containing intact E5 instead of the fragment (PCT Publication No. 96/00281).

Despite intensive research related to the use of cellulases in industrial processes, cellulases known and used in the art often show significant drawbacks. For example, many cellulases have been problematic due to low activity in detergents. Surprisingly, Applicants herein have discovered that a mutant E5 cellulase comprises characteristics particularly desirable in certain industrial applications compared to wild type E5.

SUMMARY OF THE INVENTION

It is an object of the present invention to provide for a novel mutant cellulase which has improved performance in industrial applications.

It is a further object of the present invention to provide for a novel mutant cellulase which has improved performance in laundry detergents.

It is yet a further object of the present invention to provide for a method of producing such mutant cellulases.

According to the present invention, a mutant cellulase obtainable from Thermomonospora spp. is provided which differs from a precursor cellulase in that it has been genetically engineered to introduce a substitution, deletion or addition of an amino acid residue to said precursor cellulase which provided improved activity in a detergent. Preferably, the substitution is at a residue corresponding to T140 in *Thermomonospora fusca*. Also preferably, the sequence of the utilized Thermomonospora spp. cellulase differs from the sequence identified in Lao et al., supra, in that it further comprises a phenylalanine instead of a serine residue at position 80, a methionine instead of an isoleucine at position 206, and a histidine instead of an aspartic acid at position 207 according to FIG. 1. However, either the sequence identified herein or the sequence identified in Lao are expected to be useful according to the present invention.

In another embodiment of the present invention, a DNA is provided which encodes a mutant cellulase obtainable from Thermomonospora spp., which encoded cellulase differs from a precursor cellulase in that it has been genetically engineered to introduce a substitution, deletion or addition of an amino acid residue to said precursor cellulase which provided improved activity in a detergent. Further provided are vectors comprising such DNA, host cells transformed with such vectors and fermentation broths produced by such host cells which include the mutant cellulase of the invention.

In a method embodiment of the present invention, a method of treating cellulosic material is provided comprising contacting the cellulosic material with a mutant cellulase obtainable from *Thermomonospora fusca* corresponding to E5, a mutant truncated E5, or a derivative thereof. In a process embodiment of the invention, the cellulosic material comprises cellulose containing fabric and the result of the method is to produce a stonewashed effect or an improvement in the feel and/or appearance of the fabric. In an alternative process embodiment of the invention, the cellulose containing fabric is contacted with an aqueous solution containing a detergent composition comprising a cellulase obtainable from *T. fusca* corresponding to E5, a truncated E5, or a derivative thereof.

In yet another process embodiment of the invention, the cellulosic material comprises wood pulp and the addition of cellulase facilitates the production of paper products therefrom. In yet another process embodiment of the invention, the cellulosic material comprises animal feed and the method results in an increase in the digestibility or value of said animal feed. In still further embodiments of the invention, the cellulosic material comprises grain or grain byproducts used in the production of food, starch, ethanol or sugar. In yet another embodiment of the invention, the cellulosic material comprises biomass and the cellulase is used in the reduction of biomass to useable products, e.g., glucose.

Applicants identify herein mutation to a family of cellulases related to the cellulase obtainable from *T. fusca* which is known in the literature as E5, having a surprising array of characteristics which are especially beneficial in textile processing (specifically including denim stonewashing and bio-polishing), cleaning products and detergents, pulp and paper production, food processing and as an additive for animal feed. Specifically, Applicants have discovered that mutation allows full advantage to be taken of E5's especially broad pH/activity profile on insoluble substrate, being active in the pH range from about pH 5.0 to 10.5 with very little drop off in activity at the alkaline region. Moreover, because E5 already has significant activity levels at moderate pH and temperature, is stable for extended periods of time and at temperatures in excess of 80° C., is essentially insensitive to many buffer compositions and strengths, remains active after prolonged proteolytic cleavage, and is stable in the presence of oxidants such as perborate and perborate/TAED combinations and in detergents, the additional benefits provided by the mutant cellulase provided herein are especially valuable.

The considerable advantages of the mutant E5 or mutant truncated E5 cellulase of the invention in industrial applications are significantly improved by the invention described herein. The invention itself, together with further objects and attendant advantages, will best be understood by reference to the following detailed description taken in conjunction with the accompanying drawings.

BRIEF DESCRIPTION OF THE DRAWINGS

FIG. 1 illustrates the amino acid sequence (SEQ ID NO:2) and DNA sequence (SEQ ID NO:1) of E5.

FIG. 2 illustrates the comparative performance of E5 mutant and truncated and wild type E5 for depilling and pilling prevention.

FIG. 3 illustrates the pHPLT expression vector useful for the expression of the mutant E5 according to the present invention in Bacillus.

DETAILED DESCRIPTION OF THE INVENTION

"Cotton-containing fabric" means sewn or unsewn fabrics, yarns or fibers made of pure cotton or cotton blends including cotton woven fabrics, cotton knits, cotton denims, cotton yarns, raw cotton and the like. When cotton blends are employed, the amount of cotton in the fabric is preferably at least about 35 percent by weight cotton. When employed as blends, the companion material employed in the fabric can include one or more non-cotton fibers including cellulosic or synthetic fibers such as polyamide fibers (for example, nylon 6 and nylon 66), acrylic fibers (for example, polyacrylonitrile fibers), and polyester fibers (for example, polyethylene terephthalate), polyvinyl alcohol fibers (for example, Vinylon), polyvinyl chloride fibers, polyvinylidene chloride fibers, polyurethane fibers, polyurea fibers and aramid fibers.

"Cellulose containing fabric" means any sewn or unsewn fabrics, yarns or fibers made of cotton or non-cotton containing cellulose or cotton or non-cotton containing cellulose blends including natural cellulosics and manmade cellulosics (such as jute, flax, ramie, rayon, and lyocell). Included under the heading of manmade cellulose containing fabrics are regenerated fabrics that are well known in the art such as rayon. Other manmade cellulose containing fabrics include chemically modified cellulose fibers (e.g, cellulose derivatized by acetate) and solvent-spun cellulose fibers (e.g. lyocell). Specifically included within the definition of cellulose containing fabric is any yarn or fiber made of such materials.

"Stonewashing composition" means a formulation for use in stonewashing cellulose containing fabrics. Stonewashing compositions are used to modify cellulose containing fabrics prior to presentation for consumer sale, i.e., during the manufacturing process. In contrast, detergent compositions are intended for the cleaning of soiled garments.

"Stonewashing" means the treatment of cellulose containing fabric with a cellulase solution under agitating and cascading conditions, i.e., in a rotary drum washing machine, to impart a "stonewashed" appearance to the denim. The cellulase solution according to the instant invention will functionally replace the use of stones in such art recognized methods, either completely or partially. Methods for imparting a stonewashed appearance to denim are described in U.S. Pat. No. 4,832,864 which is incorporated herein by reference in its entirety. Generally, stonewashing techniques have been applied to indigo dyed cotton denim.

"Detergent composition" means a mixture which is intended for use in a wash medium for the laundering of soiled cellulose containing fabrics. In the context of the present invention, such compositions may include, in addition to cellulases and surfactants, additional hydrolytic enzymes, builders, bleaching agents, bleach activators, bluing agents and fluorescent dyes, caking inhibitors, masking agents, cellulase activators, antioxidants, and solubilizers. Such compositions are generally used for cleaning soiled garments and are not used during the manufacturing process, in contrast to stonewashing compositions. Detergent compositions comprising cellulase are described in, for example, Clarkson et al., U.S. Pat. No. 5,290,474 and EP Publication No. 271 004, incorporated herein by reference.

"Derivative" means a protein which is derived from a precursor protein (e.g., the native protein) by addition of one or more amino acids to either or both the C-and N-terminal end, substitution of one or more amino acids at one or a number of different sites in the amino acid sequence, deletion of one or more amino acids at either or both ends of the protein or at one or more sites in the amino acid sequence, or insertion of one or more amino acids at one or more sites in the amino acid sequence. The preparation of an enzyme derivative is preferably achieved by modifying a DNA sequence which encodes for the native protein, transformation of that DNA sequence into a suitable host, and expression of the modified DNA sequence to form the derivative enzyme. The derivative of the invention includes peptides comprising altered amino acid sequences in comparison with a precursor enzyme amino acid sequence (e.g., a wild type or native state enzyme), which peptides retain a characteristic enzyme nature of the precursor enzyme but which have altered properties in some specific aspect. For example, an altered E5 or altered truncated E5 may have an increased pH optimum or increased temperature or oxidative stability but will retain its characteristic cellulolytic activity. Similarly, derivatives according to the present invention include a cellulose binding domain which has either been entirely removed, or modified in such a way so as to significantly impair its cellulose binding ability. It is contemplated that derivatives according to the present invention may be derived from a DNA fragment encoding an E5 or truncated E5 (as described below) wherein the functional activity of the expressed E5 derivative or truncated E5 is retained. For example, a DNA fragment encoding a truncated E5 may further include a DNA sequence or portion thereof encoding a hinge or linker attached to the truncated E5 DNA sequence at either the 5' or 3' end wherein the functional activity of the encoded truncated E5 domain is retained. Similarly, derivatives according to the present invention include a cellulose binding region portions of which have either been added, removed or modified in such a way so as to significantly impair or enhance its cellulose binding ability. It is contemplated that derivatives according to the present invention may be derived from a DNA fragment encoding a mutant cellulase derivative wherein the functional activity of the expressed mutant cellulase derivative is retained. Derivative further includes chemical modification to change the characteristics of the mutant cellulase.

"Expression vector" means a DNA construct comprising a DNA sequence which is operably linked to a suitable control sequence capable of effecting the expression of the DNA in a suitable host. Such control sequences may include a promoter to effect transcription, an optional operator sequence to control transcription, a sequence encoding suitable ribosome-binding sites on the mRNA, and sequences which control termination of transcription and translation. Different cell types are preferably used with different expression vectors. The vector may be a plasmid, a phage particle, or simply a potential genomic insert. Once transformed into a suitable host, the vector may replicate and function independently of the host genome, or may, under suitable conditions, integrate into the genome itself. In the present specification, plasmid and vector are sometimes used interchangeably. However, the invention is intended to include other forms of expression vectors which serve equivalent functions and which are, or become, known in the art. Thus, a wide variety of host/expression vector combinations may be employed in expressing the DNA sequences of this invention. Useful expression vectors, for example, may consist of segments of chromosomal, non-chromosomal and synthetic DNA sequences such as various known derivatives of SV40 and known bacterial plasmids, e.g., plasmids from *E. coli* including col E1, pCR1, pBR322, pMb9, pUC 19 and their derivatives, wider host range plasmids, e.g., RP4, phage DNAs e.g., the numerous derivatives of phage λ, e.g., NM989, and other DNA phages, e.g., M13 and filamentous single stranded DNA phages, yeast plasmids such as the 2μ plasmid or derivatives thereof, vectors useful in eukaryotic cells, such as vectors useful in animal cells and vectors derived from combinations of plasmids and phage DNAs, such as plasmids which have been modified to employ phage DNA or other expression control sequences. General expression techniques using the expression vectors of the present invention are known in the art and are described generally in, for example, Sambrook et al., *Molecular Cloning:A Laboratory Manual*, Second Edition, Cold Spring Harbor Press (1989). Often, such expression vectors including the DNA sequences of the invention are transformed into a unicellular host by direct insertion into the genome of a particular species through an integration event (see e.g., Benneft & Lasure, *More Gene Manipulations in Fungi*, Academic Press, San Diego, pp. 70–76 (1991) and articles cited therein describing targeted genomic insertion in fungal hosts, incorporated herein by reference).

"Host strain" or "host cell" means a suitable host for an expression vector comprising DNA according to the present invention. Host cells useful in the present invention are generally procaryotic or eucaryotic hosts, including any transformable microorganism in which expression can be achieved. Specifically, host strains may be *Bacillus subtilis, Escherichia coli, Trichoderma reesei(longibrachiatum), Saccharomyces cerevisiae* or *Aspergillus niger,* and preferably *Aspergillus niger.* Host cells are transformed or transfected with vectors constructed using recombinant DNA techniques. Such transformed host cells are capable of both replicating vectors encoding esterase and its variants (mutants) or expressing the desired peptide product. In a preferred embodiment according to the present invention, "host cell" means Bacillus spp.

"Signal sequence" means a sequence of amino acids bound to the N-terminal portion of a protein which facilitates the secretion of the mature form of the protein outside of the cell. This definition of a signal sequence is a functional one. The mature form of the extracellular protein lacks the signal sequence which is cleaved off during the secretion process.

"DNA construct or vector" (used interchangeably herein) means a nucleotide sequence which comprises one or more DNA fragments or DNA variant fragments encoding any of the novel mutant cellulases or derivatives described above.

"Functionally attached to" means that a regulatory region, such as a promoter, terminator, secretion signal or enhancer region is attached to a structural gene and controls the expression of that gene.

The term "truncated E5" refers to a protein comprising a derivative (usually shortened) of an intact E5 enzyme which retains cellulolytic activity. E5 in its intact form is believed to contain a catalytic core and a binding domain. The catalytic core and the cellulose binding domain may act together in a synergistic manner to effect efficient and often deleterious hydrolysis of cellulose fibers in a cellulose containing fabric often leading to undesirable strength loss. A truncated E5 lacking a functional binding domain may include other entities which do not include cellulose binding activity attributable to a cellulose binding domain. For example, the presence of a linker or hinge is specifically contemplated. Similarly, the covalent attachment of another enzymatic entity or a non-E5 cellulose binding domain to a truncated E5 is also specifically contemplated. It is expected that a truncated E5, or derivatives thereof according to the invention will retain at least 10% of the activity exhibited by E5 when each is assayed under similar conditions and dosed based on similar amounts of protein. The mutation of the present invention is identified by its location in the wild type enzyme. Thus, if the mutation of the present invention is used in a truncated E5, it is intended that the numbering merely refers to the numbering of the residues provided in FIG. 1. Accordingly, if truncation results in removal of residues at the end of the molecule starting with residue 1, then the 140 residue marked herein for mutation would remain the same regardless of whether it remains the 140$^{th}$ residue in the sequence.

A truncated E5 may be made by any standard means of producing a truncated enzyme. Particularly effective means include the use of protease or chemical cleavage (i.e., cyanogen bromide) to cleave the enzyme, or the use of genetic engineering to directly express a truncated E5 in a microbial host. McGinnis et al., supra, suggest that *S. lividans* protease cleaved the 120 amino acids on the N-terminal of the E5 enzyme, leaving the remainder of the enzyme as a catalytically active core. Thus, one preferred embodiment of the present invention contemplates the use of a truncated E5 differing from E5 in that an N-terminal segment of the enzyme less than 121 amino acids in length is deleted, preferably differing from E5 in that the truncated E5 comprises the sequence of intact E5 starting at the threonine at residue 121 and also having a mutation at T140. In another preferred embodiment of the present invention, a truncated E5 differs from E5 in that the amino acid sequence of E5 in the region of amino acids 1–120 has been altered to reduce or eliminate cellulose binding activity and also having a mutation at T140.

According to the present invention, a mutant cellulase obtainable from Thermomonospora spp. is provided which differs from a precursor cellulase in that it has been genetically engineered to introduce a substitution, deletion or addition of an amino acid residue to said precursor cellulase which provides improved activity in a detergent. Preferably, the substitution is at a residue corresponding to T140 in *Thermomonospora fusca*. By substitution, deletion or addition with respect to the precursor cellulase is meant that the cellulase according to the invention (the mutant E5) has been modified with reference to the amino acid sequence of a precursor cellulace (e.g., wild type E5), and not necessarily that the E5 itself has been modified. Thus, while chemical modification of the E5 is possible, it is simpler and more efficient to use genetic engineering techniques to modify a nucleic acid encoding, e.g., a wild type E5, so that the expression product, instead of the wild type E5, is the mutant E5. The presently disclosed cellulase is useful in methods of treating cellulosic material comprising contacting the cellulosic material with a cellulase corresponding to mutant E5, a mutant truncated E5, or a derivative thereof. In a process embodiment of the invention, the cellulosic material comprises cellulose containing fabric and the result of the method is to produce a stonewashed effect or an improvement in the feel and/or appearance of the fabric. In an alternative process embodiment of the invention, the cellulose containing fabric is contacted with an aqueous solution containing a detergent composition comprising a mutant cellulase corresponding to mutant E5, a mutant truncated E5, or a derivative thereof. In yet another process embodiment of the invention, the cellulosic material comprises wood pulp and the addition of the mutant cellulase facilitates the production of paper products therefrom. In yet another process embodiment of the invention, the cellulosic material comprises animal feed and the method results in an increase in the digestibility or value of said animal feed.

E5 as used herein refers to a cellulase having a molecular weight of about 45–47 kD (deduced from the amino acid sequence and confirmed by SDS-gel) and a pI of about 4.5–4.8 (as measured on IEF gel) and which is obtainable from *T. fusca*. *T. fusca* is a thermophilic, filamentous, actinomycete found in soil and common in rotting organic material such as decaying wood. The sequence of E5 is described in FIG. 1 herein and alternatively in Lao et al., supra. Also included within the scope of the invention are cellulases which have an amino acid sequence having at least 70 %, preferably 80% and most preferably 90% sequence identity to E5 and also having a mutation at a position corresponding to T140 in E5 from *Thermomonospora fusca*.

Preferably, the cellulase according to the present invention is produced utilizing genetic engineering techniques by transforming a suitable high expression host cell with a gene encoding the mutant cellulase and expressing under conditions appropriate for host cell growth and cellulase expression. As a first step, the chromosomal DNA may be obtained from the donor bacterial strain by the method of Saito and Miura, *Biochim. Biophys. Acta.*, Vol. 72, pp. 619 (1963) or by a similar method. Restriction enzyme cleavage of the chromosomal DNA thus obtained gives DNA fragments containing the alkaline cellulase gene. For this purpose, any restriction enzyme may be used provided that it does not cleave the region of said gene. In the alternative, a restriction enzyme may be used which cleaves the gene, using however, a reduced enzyme concentration or incubation time to permit only partial digestion. A preferred restriction endonuclease is Sau3A. From the resulting digestion mixture, suitable fragments (4–10 kb) may be isolated and used to transform a suitable host cell with a DNA construct comprising the DNA construct of the present invention in combination with a suitable vector sequence.

The gene encoding the cellulase of the present invention can be cloned using λ-phage (expression) vectors and *E. coli* host cells. (Alternatively PCR cloning using consensus primers designed on conserved domains may be used). After a first cloning step in *E. coli*, a cellulase gene according to the present invention can be transferred to a more preferred industrial expression host such as Bacillus or Streptomyces species, a filamentous fungus such as Aspergillus or Trichoderma, or a yeast such as Saccharomyces. High level expression and secretion obtainable in these host organisms allows accumulation of the cellulase in the fermentation medium from which it can subsequently be recovered.

Preferably, the expression host cell comprises a Bacillus sp., more preferably *Bacillus licheniformis* or *Bacillus subtilis*. In an especially preferred embodiment, the transformation host is deleted for protease genes to ensure that the product cellulase is not subject to proteolysis in the fermentation broth or concentrates thereof. A preferred general transformation and expression protocol for protease deleted Bacillus strains is provided in Ferrari et al., U.S. Pat. No. 5,264,366, incorporated herein by reference. Transformation and expression in Aspergillus is described in, for example, Berka et al., U.S. Pat. No. 5,364,770, incorporated herein by reference. A useful promoter for vectors used in *Bacillus*

*subtilis* is the AprE promoter; in *E. coli* is the Lac promoter, in *Saccharomyces cerevisiae* is PGK1; in *Aspergillus niger* is glaA; and for *Trichoderma reesei* (*longibrachiatum*) is cbh1. Preferably, the promoter when the transformation host cell is Bacillus is the aprE promoter and a preferred promoter when the transformation host cell is Aspergillus is glaA.

A wide variety of host cells are also useful in expressing the DNA sequences of this invention. These hosts may include well known eukaryotic and prokaryotic hosts, such as strains of *E. coli* Pseudomonas, Bacillus, Streptomyces, various fungi, yeast and animal cells. Preferably, the host is a Bacillus spp. and expresses the mutant cellulase of the present invention extracellularly to facilitate purification and downstream processing. Expression and purification of the mutant cellulase of the invention may be effected through art-recognized means for carrying out such processes.

In general, compositions comprising the cellulase according to the invention can be obtained by purification techniques based on the known characteristics and properties of the inventive cellulase. Specifically, where the cellulase according to the invention is part of a mixture of cellulases produced by the cultured organism, the entire cellulase mixture (whole cellulase) can be purified into substantially pure components by recognized separation techniques published in the literature, including ion exchange chromatography at a suitable pH, affinity chromatography and size exclusion. For example, in ion exchange chromatography (usually anion exchange chromatography), it is possible to separate the cellulase components by eluting with a pH gradient, or a salt gradient, or both a pH and a salt gradient. After purification, the requisite amount of the desired components could be recombined. Alternatively, genetic engineering techniques may be used to manipulate the produced cellulase mixtures, for example through the use of strains deleted in cellulase genes wherein the gene encoding the cellulase according to the invention is transformed and expressed by the otherwise cellulase deleted host strain.

Treatment of textiles according to the present invention contemplates textile processing or cleaning with a composition comprising a cellulase. Such treating includes, but is not limited to, stonewashing, modifying the texture, feel and/or appearance of cellulose containing fabrics or other techniques used during manufacturing or cleaning/reconditioning of cellulose containing fabrics.

Treating within the context of this invention contemplates the removal of "immature" or "dead" cotton, from cellulosic fabric or fibers, i.e. immature cotton which is significantly more amorphous than mature cotton. Dead cotton is known to cause uneven dyeing and is undesirable. Accordingly, the composition contemplated in the present invention includes a cellulase component intended for use in washing of a soiled manufactured cellulose containing fabric. For example, cellulase may be used in a detergent composition for washing laundry. Detergent compositions useful in accordance with the present invention include special formulations such as pre-wash, pre-soak and home-use color restoration compositions. Such treating compositions, as described herein, may be in the form of a concentrate which requires dilution or in the form of a dilute solution or form which can be applied directly to the cellulose containing fabric. General treatment techniques known in the art for cellulase treatment of textiles are described in, for example, EP Publication No. 220 016 and GB Application Nos. 1,368,599 and 2,095,275.

Treatment of a cellulosic material according to the present invention further contemplates the treatment of animal feed, pulp and/or paper, food and grain for purposes known in the art. For example, cellulase is known to increase the value of animal feed, improve the drainability of wood pulp, enhance food products and reduce fiber in grain during the grain wet milling process or dry milling process.

According to a preferred embodiment of the present invention, the cellulase compositions described above may be employed as a stonewashing composition. Preferably, stonewashing according to the instant invention comprises preparing an aqueous solution which contains an effective amount of cellulase together with other optional ingredients including, for example, a buffer, a surfactant, and a scouring agent. An effective amount of cellulase enzyme composition is a concentration of cellulase enzyme sufficient for its intended purpose. Thus an "effective amount" of cellulase in the stonewashing composition according to the present invention is that amount which will provide the desired treatment, e.g., stonewashing. The amount of cellulase employed is also dependent on the equipment employed, the process parameters employed (the temperature of the cellulase treatment solution, the exposure time to the cellulase solution, and the like), and the cellulase activity (e.g., a particular solution will require a lower concentration of cellulase where a more active cellulase composition is used as compared to a less active cellulase composition). The exact concentration of cellulase in the aqueous treatment solution to which the fabric to be stonewashed is added can be readily determined by the skilled artisan based on the above factors as well as the desired result. Preferably the cellulase is present in a concentration of from 1 to 5,000 ppm and most preferably 10 to 200 ppm total protein.

Optionally, a buffer is employed in the stonewashing composition such that the concentration of buffer is sufficient to maintain the pH of the solution within the range wherein the employed cellulase exhibits activity which, in turn, depends on the nature of the cellulase employed. The exact concentration of buffer employed will depend on several factors which the skilled artisan can readily take into account. In the present case, it is expected that the mutant E5 will be useful under conditions from about 5.0 through about 10.5 on insoluble substrate depending on the specific needs of the textile processor. Suitable buffers at pH within the activity range of E5 are well known to those skilled in the art in the field.

In addition to cellulase and a buffer, the stonewashing composition may optionally contain a surfactant. Suitable surfactants include any surfactant compatible with the cellulase and the fabric including, for example, anionic, nonionic and ampholytic surfactants. Suitable anionic surfactants for use herein include linear or branched alkylbenzenesulfonates; alkyl or alkenyl ether sulfates having linear or branched alkyl groups or alkenyl groups; alkyl or alkenyl sulfates; olefinsulfonates; alkanesulfonates and the like. Suitable counter ions for anionic surfactants include alkali metal ions such as sodium and potassium; alkaline earth metal ions such as calcium and magnesium; ammonium ion; and alkanolamines having 1 to 3 alkanol groups of carbon number 2 or 3. Ampholytic surfactants include quaternary ammonium salt sulfonates, and betaine-type ampholytic surfactants. Such ampholytic surfactants have both the positive and negative charged groups in the same molecule. Nonionic surfactants generally comprise polyoxyalkylene ethers, as well as higher fatty acid alkanolamides or alkylene oxide adduct thereof, and fatty acid glycerine monoesters. Mixtures of surfactants can also be employed in manners known to those skilled in the art.

In a preferred embodiment, a concentrated stonewashing composition can be prepared for use in the methods described herein. Such concentrates would contain concentrated amounts of the cellulase composition described above, buffer and surfactant, preferably in an aqueous solution. When so formulated, the stonewashing concentrate can readily be diluted with water so as to quickly and accurately prepare stonewashing compositions according to the present invention and having the requisite concentration of these additives. When aqueous concentrates are formulated, these concentrates can be diluted so as to arrive at the requisite concentration of the components in the cellulase solution as indicated above. As is readily apparent, such stonewashing concentrates will permit facile formulation of the cellulase solutions as well as permit feasible transportation of the concentration to the location where it will be used. The stonewashing concentrate can be in any art recognized form, for example, liquid, emulsion, gel, or paste. Such forms are well known to those skilled in the art.

When a solid stonewashing concentrate is employed, the cellulase composition may be a granule, a powder, an agglomerate or a solid disk. When granules are used, the granules are preferably formulated so as to contain a cellulase protecting agent. See, for example, U.S. Ser. No. 07/642,669, filed Jan. 17, 1991 as Attorney Docket No. 010055-073 and entitled "GRANULES CONTAINING BOTH AN ENZYME AND AN ENZYME PROTECTING AGENT AND DETERGENT COMPOSITIONS CONTAINING SUCH GRANULES," which application is incorporated herein by reference in its entirety. Likewise, the granules can be formulated so as to contain materials to reduce the rate of dissolution of the granules into the wash medium. Such materials and granules are disclosed in U.S. Pat. No. 5,254,283 which is incorporated herein by reference in its entirety.

Other materials can also be used with or placed in the stonewashing composition of the present invention as desired, including stones, pumice, fillers, solvents, enzyme activators, and anti-redeposition agents.

The cellulose containing fabric is contacted with the stonewashing composition containing an effective amount of the cellulase by intermingling the treating composition with the stonewashing composition, and thus bringing the cellulase enzyme into proximity with the fabric. Subsequently, the aqueous solution containing the cellulase and the fabric is agitated. If the treating composition is an aqueous solution, the fabric may be directly soaked in the solution. Similarly, where the stonewashing composition is a concentrate, the concentrate is diluted into a water bath with the cellulose containing fabric. When the stonewashing composition is in a solid form, for example a pre-wash gel or solid stick, the stonewashing composition may be contacted by directly applying the composition to the fabric or to the wash liquor.

The cellulose containing fabric is incubated with the stonewashing solution under conditions effective to allow the enzymatic action to confer a stonewashed appearance to the cellulose containing fabric. For example, during stonewashing, the pH, liquor ratio, temperature and reaction time may be adjusted to optimize the conditions under which the stonewashing composition acts. "Effective conditions" necessarily refers to the pH, liquor ratio, and temperature which allow the cellulase enzyme to react efficiently with cellulose containing fabric. The reaction conditions effective for the stonewashing compositions of the present invention are substantially similar to well known methods used with corresponding prior art cellulase compositions. Accordingly, it is within the skill of those in the art to maximize conditions for using the stonewashing compositions according to the present invention.

The liquor ratios during stonewashing, i.e., the ratio of weight of stonewashing composition solution (i.e., the wash liquor) to the weight of fabric, employed herein is generally an amount sufficient to achieve the desired stonewashing effect in the denim fabric and is dependent upon the process used. Preferably, the liquor ratios are from about 4:1 to about 50:1; more preferably from 5:1 to about 20:1, and most preferably from about 10:1 to about 15:1.

Reaction temperatures during stonewashing with the present stonewashing compositions are governed by two competing factors. Firstly, higher temperatures generally correspond to enhanced reaction kinetics, i.e., faster reactions, which permit reduced reaction times as compared to reaction times required at lower temperatures. Accordingly, reaction temperatures are generally at least about 10° C. and greater. Secondly, cellulase is a protein which loses activity beyond a given reaction temperature, which temperature is dependent on the nature of the cellulase used. Thus, if the reaction temperature is permitted to go too high, the cellulolytic activity is lost as a result of the denaturing of the cellulase. The cellulase of the invention is expected to show excellent thermostability, allowing the temperature of the stonewash to be quite high, i.e., greater than 70° C. if necessary. However, standard temperatures in the art generally comprise those in the range of 35° C. to 65° C. which will also be suitable for the cellulase of the invention.

Reaction times are dependent on the specific conditions under which the stonewashing occurs. For example, pH, temperature and concentration of cellulase will all effect the optimal reaction time. Generally, reaction times are from about 5 minutes to about 5 hours, and preferably from about 10 minutes to about 3 hours and, more preferably, from about 20 minutes to about 1 hour.

According to yet another preferred embodiment of the present invention, the cellulase compositions described above may be employed in a detergent composition. The detergent compositions according to the present invention are useful as pre-wash compositions, pre-soak compositions, or for cleaning during the regular wash or rinse cycle. Preferably, the detergent composition of the present invention comprises an effective amount of cellulase, a surfactant, and optionally include other ingredients described below.

An effective amount of cellulase employed in the detergent compositions of this invention is an amount sufficient to impart the desirable effects known to be produced by cellulase on cellulose containing fabrics, for example, depilling, softening, anti-pilling, surface fiber removal and cleaning. Preferably, the cellulase in the detergent composition is employed in a concentration of about 10 ppm to about 20,000 ppm of detergent.

The concentration of cellulase enzyme employed in the detergent composition is preferably selected so that upon dilution into a wash medium, the concentration of cellulase enzyme is in a range of about 0.01 to about 1000 ppm, preferably from about 0.02 ppm to about 500 ppm, and most preferably from about 0.5 ppm to about 250 ppm total protein. The amount of cellulase enzyme employed in the detergent composition will depend on the extent to which the detergent will be diluted upon addition to water so as to form a wash solution.

The detergent compositions of the present invention may be in any art recognized form, for example, as a liquid diluent, in granules, in emulsions, in gels, or in pastes. Such forms are well known to the skilled artisan. When a solid detergent composition is employed, the cellulase is preferably formulated as granules. Preferably, the granules can be formulated so as to additionally contain a cellulase protecting agent. See, for instance, U.S. Ser. No. 07/642,669 filed Jan. 17, 1991 as Attorney Docket No. 010055-073 and entitled "GRANULES CONTAINING BOTH AN ENZYME AND AN ENZYME PROTECTING AGENT AND DETERGENT COMPOSITIONS CONTAINING SUCH GRANULES" which application is incorporated herein by reference in its entirety. Likewise, the granule can be formulated so as to contain materials to reduce the rate of dissolution of the granule into the wash medium. Such materials and granules are disclosed in U.S. Pat. No. 5,254,283 which is incorporated herein by reference in its entirety.

The detergent compositions of this invention employ a surface active agent, i.e., surfactant, including anionic, nonionic and ampholytic surfactants well known for their use in detergent compositions.

Suitable anionic surfactants for use in the detergent composition of this invention include linear or branched alkylbenzenesulfonates; alkyl or alkenyl ether sulfates having linear or branched alkyl groups or alkenyl groups; alkyl or alkenyl sulfates; olefinsulfonates; and alkanesul-fonates. Suitable counter ions for anionic surfactants include alkali metal ions such as sodium and potassium; alkaline earth metal ions such as calcium and magnesium; ammonium ion; and alkanolamines having 1 to 3 alkanol groups of carbon number 2 or 3. Ampholytic surfactants include quaternary ammonium salt sulfonates, and betaine-type ampholytic surfactants. Such ampholytic surfactants have both the positive and negative charged groups in the same molecule. Nonionic surfactants generally comprise polyoxyal-kylene ethers, as well as higher fatty acid alkanolamides or alkylene oxide adduct thereof, fatty acid glycerine monoesters, and the like. Suitable surfactants for use in this invention are disclosed in British Patent Application No. 2 094 826 A, the disclosure of which is incorporated herein by reference. Mixtures of such surfactants can also be used. The surfactant or a mixture of surfactants is generally employed in the detergent compositions of this invention in an amount from about 1 weight percent to about 95 weight percent of the total detergent composition and preferably from about 5 weight percent to about 45 weight percent of the total detergent composition. In addition to the cellulase composition and the surfactant(s), the detergent compositions of this invention can optionally contain one or more of the following components:

Hydrolases Except Cellulase

Suitable hydrolases include carboxylate ester hydrolase, thioester hydrolase, phosphate monoester hydrolase, and phosphate diester hydrolase which act on the ester bond; glycoside hydrolase which acts on glycosyl compounds; an enzyme that hydrolyzes N-glycosyl compounds; thioether hydrolase which acts on the ether bond; and a-amino-acyl-peptide hydrolase, peptidyl-amino acid hydrolase, acyl-amino acid hydrolase, dipeptide hydrolase, and peptidyl-peptide hydrolase which act on the peptide bond. Preferable among them are carboxylate ester hydrolase, glycoside hydrolase, and peptidyl-peptide hydrolase. Suitable hydrolases include (1) proteases belonging to peptidyl-peptide hydrolase such as pepsin, pepsin B, rennin, trypsin, chymotrypsin A, chymotrypsin B, elastase, enterokinase, cathepsin C, papain, chymopapain, ficin, thrombin, fibrinolysin, renin, subtilisin, aspergillopeptidase A, collagenase, clostridiopeptidase B, kallikrein, gastrisin, cathepsin D., bromelin, keratinase, chymotrypsin C, pepsin C, aspergillopeptidase B, urokinase, carboxypeptidase A and B, and aminopeptidase; (2) glycoside hydrolases (cellulase which is an essential ingredient is excluded from this group) α-amylase, β-amylase, gluco amylase, invertase, lysozyme, pectinase, chitinase, and dextranase. Preferably among them are α-amylase and β-amylase. They function in acid to neutral systems, but one which is obtained from bacteria exhibits high activity in an alkaline system; (3) carboxylate ester hydrolase including carboxyl esterase, lipase, pectin esterase, and chlorophyllase. Especially effective among them is lipase.

The hydrolase other than cellulase is incorporated into the detergent composition as much as required according to the purpose. It should preferably be incorporated in an amount of 0.001 to 5 weight percent, and more preferably 0.02 to 3 weight percent, in terms of purified protein. This enzyme should be used in the form of granules made of crude enzyme alone or in combination with other components in the detergent composition. Granules of crude enzyme are used in such an amount that the purified enzyme is 0.001 to 50 weight percent in the granules. The granules are used in an amount of 0.002 to 20 and preferably 0.1 to 10 weight percent. As with cellulases, these granules can be formulated so as to contain an enzyme protecting agent and a dissolution retardant material.

Cationic Surfactants and Long-Chain Fafty Acid Salts

Such cationic surfactants and long-chain fatty acid salts include saturated or unsaturated fatty acid salts, alkyl or alkenyl ether carboxylic acid salts, a-sulfofatty acid salts or esters, amino acid-type surfactants, phosphate ester surfactants, quaternary ammonium salts including those having 3 to 4 alkyl substituents and up to 1 phenyl substituted alkyl substituents. Suitable cationic surfactants and long-chain fatty acid salts are disclosed in British Patent Application No. 2 094 826 A, the disclosure of which is incorporated herein by reference. The composition may contain from about 1 to about 20 weight percent of such cationic surfactants and long-chain fatty acid salts.

Builders

A. Divalent Sequestering Agents

The composition may contain from about 0 to about 50 weight percent of one or more builder components selected from the group consisting of alkali metal salts and alkanolamine salts of the following compounds: phosphates, phosphonates, phosphonocarboxylates, salts of amino acids, aminopolyacetates high molecular electrolytes, non-dissociating polymers, salts of dicarboxylic acids, and aluminosilicate salts. Suitable divalent sequestering gents are disclosed in British Patent Application No. 2 094 826 A, the disclosure of which is incorporated herein by reference.

B. Alkalis or Inorganic Electrolytes

The composition may contain from about 1 to about 50 weight percent, preferably from about 5 to about 30 weight percent, based on the composition of one or more alkali metal salts of the following compounds as the alkalis or inorganic electrolytes: silicates, carbonates and sulfates as well as organic alkalis such as triethanolamine, diethanolamine, monoethanolamine and triisopropanolamine.

Antiredeposition Agents

The composition may contain from about 0.1 to about 5 weight percent of one or more of the following compounds as antiredeposition agents: polyethylene glycol, polyvinyl alcohol, polyvinylpyrrolidone and carboxymethylcellulose.

Among them, a combination of carboxymethyl-cellulose and/or polyethylene glycol with the cellulase composition of the present invention provides for an especially useful dirt removing composition.

Bleaching Agents

The use of the cellulase of the present invention in combination with a bleaching agent such as potassium monopersulfate, sodium percarbonate, sodium perborate, sodium sulfate/hydrogen peroxide adduct and sodium chloride/hydrogen peroxide adduct or/and a photo-sensitive bleaching dye such as zinc or aluminum salt of sulfonated phthalocyanine further improves the detergenting effects. Similarly, bleaching agents and bleach catalysts as described in EP 684 304 may be used.

Bluing Agents and Fluorescent Dyes

Various bluing agents and fluorescent dyes may be incorporated in the composition, if necessary. Suitable bluing agents and fluorescent dyes are disclosed in British Patent Application No. 2 094 826 A, the disclosure of which is incorporated herein by reference.

Caking Inhibitors

The following caking inhibitors may be incorporated in the powdery detergent: p-toluenesulfonic acid salts, xylenesulfonic acid salts, acetic acid salts, sulfosuccinic acid salts, talc, finely pulverized silica, amorphous silicas, clay, calcium silicate (such as Micro-Cell of Johns Manville Co.), calcium carbonate and magnesium oxide.

Masking Agents for Factors Inhibiting the Cellulase Activity

The cellulase composition of this invention are deactivated in some cases in the presence of copper, zinc, chromium, mercury, lead, manganese or silver ions or their compounds. Various metal chelating agents and metal-precipitating agents are effective against these inhibitors. They include, for example, divalent metal ion sequestering agents as listed in the above item with reference to optional additives as well as magnesium silicate and magnesium sulfate.

Cellobiose, glucose and gluconolactone act sometimes as inhibitors. It is preferred to avoid the co-presence of these saccharides with the cellulase as far as possible. In case the co-presence in unavoidable, it is necessary to avoid the direct contact of the saccharides with the cellulase by, for example, coating them.

Long-chain-fatty acid salts and cationic surfactants act as the inhibitors in some cases. However, the co-presence of these substances with the cellulase is allowable if the direct contact of them is prevented by some means such as tableting or coating.

The above-mentioned masking agents and methods may be employed, if necessary, in the present invention.

Cellulase-Activators

The activators vary depending on variety of the cellulases. In the presence of proteins, cobalt and its salts, magnesium and its salts, and calcium and its salts, potassium and its salts, sodium and its salts or monosaccharides such as mannose and xylose, the cellulases are activated and their deterging powers are improved remarkably.

Antioxidants

The antioxidants include, for example, tert-butyl-hydroxytoluene, 4,4'-butylidenebis(6-tert-butyl-3-methylphenol), 2,2'-butylidenebis(6-tert-butyl-4-methylphenol), monostyrenated cresol, distyrenated cresol, monostyrenated phenol, distyrenated phenol and 1,1-bis(4-hydroxy-phenyl)cyclohexane.

Solubilizers

The solubilizers include, for example, lower alcohols such as ethanol, benzenesulfonate salts, lower alkylbenzenesulfonate salts such as p-toluenesulfonate salts, glycols such as propylene glycol, acetylbenzene-sulfonate salts, acetamides, pyridinedicarboxylic acid amides, benzoate salts and urea.

The detergent composition of the present invention can be used in a broad pH range from acidic to alkaline pH. In a preferred embodiment, the detergent composition of the present invention can be used in mildly acidic, neutral or alkaline detergent wash media having a pH of from above 5 to no more than about 12.

Aside from the above ingredients, perfumes, buffers, preservatives, dyes and the like can be used, if desired, with the detergent compositions of this invention. Such components are conventionally employed in amounts heretofore used in the art.

When a detergent base used in the present invention is in the form of a powder, it may be one which is prepared by any known preparation methods including a spray-drying method and a granulation method. The detergent base obtained particularly by the spray-drying method, agglomeration method, dry mixing method or non-tower route methods are preferred. The detergent base obtained by the spray-drying method is not restricted with respect to preparation conditions. The detergent base obtained by the spray-drying method is hollow granules which are obtained by spraying an aqueous slurry of heat-resistant ingredients, such as surface active agents and builders, into a hot space. After the spray-drying, perfumes, enzymes, bleaching agents, inorganic alkaline builders may be added. With a highly dense, granular detergent base obtained such as by the spray-drying-granulation or agglomeration method, various ingredients may also be added after the preparation of the base.

When the detergent base is a liquid, it may be either a homogeneous solution or an inhomogeneous dispersion. For removing the decomposition of carboxymethylcellulose by the cellulase in the detergent, it is desirable that carboxymethylcellulose is granulated or coated before the incorporation in the composition.

The detergent compositions of this invention may be incubated with cellulose containing fabric, for example soiled fabrics, in industrial and household uses at temperatures, reaction times and liquor ratios conventionally employed in these environments. The incubation conditions, i.e., the conditions effective for treating cellulose containing fabrics with detergent compositions according to the present invention, will be readily ascertainable by those of skill in the art. Accordingly, the appropriate conditions effective for treatment with the present detergents will correspond to those using similar detergent compositions which include known cellulases.

Detergents according to the present invention may additionally be formulated as a pre-wash in the appropriate solution at an intermediate pH where sufficient activity exists to provide desired improvements softening, depilling, pilling prevention, surface fiber removal or cleaning. When the detergent composition is a pre-soak (e.g., pre-wash or pre-treatment) composition, either as a liquid, spray, gel or paste composition, the truncated cellulase enzyme is generally employed from about 0.0001 to about 1 weight percent based on the total weight of the pre-soak or pre-treatment composition. In such compositions, a surfactant may optionally be employed and when employed, is generally present at a concentration of from about 0.005 to about 20 weight percent based on the total weight of the pre-soak. The remainder of the composition comprises conventional components used in the pre-soak, i.e., diluent, buffers, other enzymes (proteases), and the like at their conventional concentrations.

It is contemplated that compositions comprising truncated cellulase enzymes described herein can be used in home use as a stand alone composition suitable for restoring color to faded fabrics (see, for example, U.S. Pat. No. 4,738,682, which is incorporated herein by reference in its entirety) as well as used in a spot-remover and for depilling and antipilling (pilling prevention).

The use of the cellulase according to the invention may be particularly effective in feed additives and in the processing of pulp and paper. These additional industrial applications are described in, for example, PCT Publication No. 95/16360 and Finnish Granted Patent No. 87372, respectively.

In order to further illustrate the present invention and advantages thereof, the following specific examples are given with the understanding that they are being offered to illustrate the present invention and should not be construed in any way as limiting its scope.

EXAMPLES

Example 1

Preparation of Host Cells Producing Mutant E5

The following procedure may be used to prepare the mutant E5 according to the invention. Generally, the procedure described below comprises isolating wild type genomic DNA from *T. fusca* and cloning the E5 gene from that DNA. After amplification and purification, the DNA is mutated via oligonucleotide directed mutagenesis and the mutant gene cloned into an appropriate vector, transformed into an appropriate strain and expressed. The subsequent protein product may be purified or use as whole fermentation broth, alone or in combination with other ingredients.

(A) AMPLIFICATION OF DNA ENCODING E5 FROM *T. FUSCA*:

The wild type E5 gene may be amplified by following a procedure such as that below: The following primers were created to facilitate creation of an E5 expression vector.

5' primer 6951 [Perkin-Elmer Ltd SEQ ID NO:3]:
    LAT signal sequence                N terminal sequence E5
    CCTCATT<u>CTGCAG</u>CATCGGCGGCCGGTCTCACCGCCACAGTC
               <u>PstI</u>

3'primer 6953 (reversed complementair)[Perkin-Elmer Ltd SEQ ID NO:4]:
            C terminal sequence E5
    TTT<u>GTTAAC</u>TCAGGACTGGAGCTTGCTCCG
       <u>HpaI</u>

Template DNA is genomic DNA was derived from *Thermomonospora fusca*. Polymerase used was TaKaRa LA Taq; LA PCR Kit Ver.2, Cat.#RR013; Takara Shuzo Co.,Ltd. A PCR mixture comprising 20 pmol 5' primer 6951; 20 pmol 3' primer 6953; 1 ng *T. fusca* genomic DNA; 10 µl 10× LA PCR Buffer II (Mg$^{2+}$ plus)*; 16 µl dNTP mixture*; 1 µl (5U) TaKaRa LA Taq polymerase* with mQ added up to a volume of 100 µl. (*=present in the Takara Kit).

PCR was performed according to the next procedure: (1) 98° C. for 2 minutes; (2) 94° C. for 45 seconds; (3) 55° C. for 45 seconds; (4) 72° C. for 2 minutes; (5) Goto step 2 for 29 more cycles; (6) 72° C. for 7 minutes; (7) 4° C. storage. The PCR fragment was purified using the Qiagen quick PCR purification KIT.

E5 cellulase was then cloned into pHPLT (FIG. 3), an expression vector which contains the *B. licheniformis* α-amylase promoter and partial signal sequence (BamHI-PstI), the *B. licheniformis* α-amylase terminator (HpaI-HindIII), and the pUB110 sequence from HindIII-BamHI containing the neomycin resistance marker. In between the signal sequence and the terminator are unique cloning sites (PstI and HpaI) in which mature sequences can be cloned.

2 µg pHPLT and 1 µg E5 PCR DNA were separately cut by incubation with HpaI (GIBCO BRL; buffer 4) for 2 h at 37° C. The digest was then purified using Qiagen quick PCR purification KIT. The mixtures were cut separately with PstI (GIBCO BRL; buffer 2) and purified using the Qiagen guick PCR prurification KIT and the column eluted using 50 µl mQ. Put 2.5 µl on agarose 0.8% TBE gel. Approximately equimolar amounts of DNA were ligated using the following conditions:

| Ligation | ligA (8/8/1996) | ligB (8/8/1996) |
|---|---|---|
| pHPLT digested (PstI + HpaI) | 10µl | 10µl |
| PCR E5 digested (PstI + HpaI) | 10µl | |
| 5x T4 ligation buffer (BIBCO BRL) | 6µl | 6µl |
| mQ | 3µl | 13µl |
| T4 DNA ligase (1U/µl) | 1µl | 1µl | pHPLT (xHpaIxPstI): 2.5 µl ≈ 50 ng
E5 PCR(xHpaIxPstI): 2.5 µl ≈ 12 ng

Ligate over night at 15° C.; transform *B. subtilis* DS12367 (apr, npr, spo, his) with 15 µl ligation mixture using the well known Spizizen procedure using histidine as an auxotrophic marker as follows:

(1) Media:
  2× Spizizen (100 ml):
    28 g K$_2$HPO$_4$
    12 g KH$_2$PO$_4$
    4 g (NH$_4$)$_2$SO$_4$
    2 g sodiumcitrate
    0.4 g MgSO$_4$.7H$_2$O
  2× Spizizen complete: 1 ml 50% glucose (100 ml)
    100 µl casamino acids
    100 µl 20 mg/ml histidine
  Minimal medium agar:
  Solution A:
    10 g/l K$_2$HPO$_4$
    6 g/l KH$_2$PO$_4$
    1 g/l Na$_3$citrate.2H$_2$O
    0.2 g/l MgSO$_4$.7H$_2$O
    250 µg/l MnSO$_4$.4H$_2$O
    2 g/l L-glutamic acid
  Solution B:
    35 g/l Difco-agar
(2) Sterilize solution A and B separately mix 1:1 and add per liter:
    10 ml 50% glucose
    1 ml 20% casamino acids
    1 ml 20 mg/ml histidine
    1 ml 40 mg/ml neomycin A fresh colony was inoculated into 10 ml complete 2× spizizen medium in a 500 ml shake flask and gently shaken in a water bath over night at 37° C. The solution was diluted to OD$_{575nm}$~0.1 using 2× spizizen solution and incubated at 37° C. and 300 rpm. The cells were allowed to grow for a maximum of 5 hours or until the OD$_{575nm}$~1, which ever is first. The solution was diluted to 1:1 using 2× spizizen medium and the cells grown for 1.5 h at 37° C. and 300 rpm to produce competent cells. DNA was placed in a tube and 1 ml competent cells added. The solution was incubated for 1 h at 37° C. and 250 rpm. 250 µl transformed cells were cultured on selective minimal plates incubate for 2 days at 37° C. to obtain transformed cells. The transformed cells were grown on minimal agar plates containing 40 µg/ml neomycin at 37° C. for two days. The cells were replica plated onto Hl agar plates containing 20 µg/ml neomycin and 0.3% CMC and incubated over night at 37° C. For both of ligation A and B, several transformants were found (20–30), and the cellulase producing colonies detected. The selected cellulase producing strain was streaked on a HI agar plate containing 20 μg/ml neomycin and incubate at 37° C. over night. A preculture was prepared by obtaining an isolated colony and treating with 10 ml Trypton Soya Broth (TSB) medium, the flask incubated over night at 300 rpm at 37° C. A shake flask was prepared by combining 100 ml Synthetic Medium and 50 μg/ml neomycin with 100 μl of the over night grown preculture. Shake at 300 rpm at 37° C. for 72 h.

Synthetic Medium (volume is 1 liter) is prepared by combining 12.5 g/l yeast extract, 0.5 g/l $CaCl_2$, 2.25 g/l $MgCL_2.6H_2O$, 2 ml $MnSO_4.4H_2O$ (10 mg/ml solution), 0.1 ml $CoCl_2.6H_2O$ (10 mg/ml solution) 0.5 g/l citric acid; 0.25 ml anti foam and 600 ml deminiralized water. 60 ml is placed into a 500 ml shake flask containing a baffle and milkflilter and sterilized for 20' at 120° C. After sterilization add 20 ml 30% maltose and 20 ml 1M Phosphatebuffer pH6.8.

(B) OLIGONUCLEOTIDE DIRECTED MUTAGENESIS:

The DNA prepared as stated above is used for the preparation of mutant DNA sequences encoding the proteins according to the invention. According to this protocol, a series of mutagenic primers encoding for substitution T140I were prepared. The gene mutations encoding for these changes may be made by treating the above described DNA by PCR, according to standard procedures. Generally, mutagenic primers having the appropriate modified nucleotides may used as templates for the PCR primers resulting in a lengthened double stranded DNA. Initially PCR primers are annealed at 35° C. for five minutes followed by a one minute DNA extension with taq polymerase at 75° C. The double stranded DNA may then be melted at 95° C. for one minute, followed by the annealing and extension steps. Melting, annealing and extension continue for a total of 30 cycles. DNA upstream and downstream of positions 140 and 425 may be made in separate PCR reactions. The DNA is melted at 95° C. for one minute, annealed at 45° C. for three minutes and elongated at 68° C. for 3 minutes. This procedure is repeated for 18 cycles using pfu polymerase. The upstream portion of DNA described above is attached to double stranded mutagenic primers described above. The downstream portions of DNA may be attached to give the final product. To facilitate subsequent placement of the mutant gene in an expression vector, unique restriction sites may be inserted upstream and downstream of the 140 site. The final PCR product is digested with the appropriate restriction endonucleases and the fragments isolated by polyacrylamide gel electrophoresis and subcloned into an appropriate vector. Mutations may be confirmed by dideoxy sequencing (Sanger et al., *Proc. Natl. Acad. Sci. U.S.A.*, Vol. 74, pp. 5463–5467 (1977)).

The mutant gene may then be placed into an appropriate expression vector, transformed into an appropriate strain and expressed, as described above in Section (A) to produce mutant cellulase.

(C) PURIFICATION OF THE E5 MUTANT WAS AS FOLLOWS:

The fermentation broth was cell separated, ultrafiltered and diafiltered. The resulting concentrate (2 liters) was treated as follows:

1) Enough dH2O was added to lower the ionic strength to roughly 50 mM salt (in this case, 6 liters dH2O added).
2) 200 ml of Q-sepharose resin was added in batch, to bind the E5 cellulase. Incubation was for roughly 1 hr at 4 C.
3) This 8 liters of resin/broth was centrifuged and the resin was collected for chromatography.
4) This 200 ml of resin was poured over an 1200 ml bed of Q-seph resin, previously equilibrated in 25 mM NPi, 7.0. Column dimensions 10×18 cm (W×L).
5) Washed resin with 2 liters of equilibration buffer at 50 ml/min on Bio-Pilot.
6) An 8 liter gradient of 0–1M NaCl in 25 mM NPi, 7.0 was applied to column.
7) E5 core came off gradient first, between fraction 35–53, in approx. 200 mM NaCl. E5 full length came off the gradient second, between fractions 54–70 in approx. 340 mM NaCl.
8) The full length E5 was concentrated using PM10 membranes.
9) This concentrate was then applied to a second Q-seph column with dimensions of 1.5×10 cm (~18 mls).
10) Washed with 50 mls of 25 mM NPi, 7.0. 200 mls of a 0–300 mM NaCl gradient was applied to this column.
11) Contaminating E5 core came off column in roughly 60 mM NaCl. E5 full length came off in approximately 130 mM NaCl.
12) The E5 full length was concentrated as before.
13) 0.12M Ammonium Sulfate was added to E5 full length.
14) This sample was then applied to a phenyl-sepharose column with the dimensions 2.5×7 cm (~35 mls), which had been previously equilibrated in 0.12M Ammonium Sulfate.
15) The column was washed with 75 mls of 0.12M ammonium sulfate.
16) Elution of E5 full length was with isocratic addition of dH2O.
17) This sample was concentrated to approx. 1 ml and contained roughly 40 mgs of >95% pure E5 full length protein.

Example 2

Performance of Mutant E5 In Treating Textiles

In this Example, the ability of mutant E5 according to the invention to provide desirable textile modification effects in detergent was analyzed. Three *Thermomonospora fusca*E5 samples were evaluated for pilling prevention and depilling at pH 8 and pH 10 in a Detergent Cellulase Terg-O-Tometer Test (DCTTT). All samples were dosed at 25 mg protein/liter. The three E5 samples compared were the mutant E5, E5 core (a truncated E5 cellulase lacking the first 120 N-terminal amino acids) and wild type E5. A no cellulase control was also used.

Conditions were as follows:

Wash temperature—40° C.
Wash Time—2.5 hours
agitation speed—125 rpm
total wash volume—1 liter
number of swatches per wash—8
pH 8 buffer—20 mM phosphate/citrate
pH 10 buffer—20 mM bicarbonate
Fabrics: (1) new blue Burlington cotton knit; (2) AATCC. Testfabrics Cotton knit style 460 washed 25 times.

Swatches were analyzed by a panel of 4 persons and compared against a standard rating panel on a scale of 1 to 5 for both depilling and pilling prevention. The results are provided in FIG. 2.

As shown in FIG. 2, the E5 mutant of the invention performs better under the conditions of the test than either of the other two E5 enzymes and the control.

We claim:

1. A mutant E5 cellulase derived from a precursor cellulase by the addition, substitution or deletion of a residue corresponding to T140 in Thermonospora spp.

2. The mutant cellulase according to claim 1, wherein said substitution comprises T140I.

3. The mutant cellulase according to claim 1, wherein said Thermomonospora spp. comprises *Thermomonospora fusca*.

4. The mutant cellulase according to claim 1, wherein said cellulase comprises the amino acid sequence provided in FIG. 1.

5. A method of producing a mutant cellulase according to claim 1, comprising the steps of:

a) preparing a DNA encoding a mutant E5 cellulase;

b) preparing a vector comprising said DNA;

c) transforming a suitable expression host with said vector;

d) growing said expression host or progeny thereof under conditions so as to produce the mutant E5.

6. The method according to claim 5, wherein said DNA is derived from *Thermomonospora fusca*.

7. The method according to claim 6, wherein said mutation comprises T140I.

8. A detergent comprising the cellulase according to claim 1.

9. A detergent according to claim 7 for use with household laundry.

10. A method of treating a cellulose containing textile to modify its feel or appearance.

11. A method of treating an animal feed comprising contacting said animal feed with the cellulase of claim 1.

* * * * *

SEQUENCE LISTING ( 1 ) GENERAL INFORMATION:

( i i i ) NUMBER OF SEQUENCES: 4

( 2 ) INFORMATION FOR SEQ ID NO:1:

( i ) SEQUENCE CHARACTERISTICS:
        ( A ) LENGTH: 1293 base pairs
        ( B ) TYPE: nucleic acid
        ( C ) STRANDEDNESS: single
        ( D ) TOPOLOGY: linear ( x i ) SEQUENCE DESCRIPTION: SEQ ID NO:1:

```
GCCGGTCTCA   CCGCCACAGT   CACCAAAGAA   TCCTCGTGGG   ACAACGGCTA   CTCCGCGTCC        60
GTCACCGTCC   GCAACGACAC   CTCGAGCACC   GTCTCCCAGT   GGGAGGTCGT   CCTCACCCTG       120
CCCGGCGGCA   CTACAGTGGC   CCAGGTGTGG   AACGCCCAGC   ACACCAGCAG   CGGCAACTCC       180
CACACCTTCA   CCGGGGTTTC   CTGGAACAGC   ACCATCCCGC   CGGAGGCAC    CGCCTCCTTC       240
GGCTTCATCG   CTTCCGGCAG   CGGCGAACCC   ACCCACTGCA   CCATCAACGG   CGCCCCCTGC       300
GACGAAGGCT   CCGAGCCGGG   CGGCCCCGGC   GGTCCCGGAA   CCCCCTCCCC   CGACCCCGGC       360
ACGCAGCCCG   GCACCGGCAC   CCCGGTCGAG   CGGTACGGCA   AAGTCCAGGT   CTGCGGCATC       420
CAGCTCTGCG   ACGAGCACGG   CAACCCGGTC   CAACTGCGCG   GCATGAGCAC   CCACGGCATC       480
CAGTGGTTCG   ACCACTGCCT   GACCGACAGC   TCGCTGGACG   CCCTGGCCTA   CGACTGGAAG       540
GCCGACATCA   TCCGCCTGTC   CATGTACATC   CAGGAAGACG   GCTACGAGAC   CAACCCGCGC       600
GGCTTCACCG   ACCGGATGCA   CCAGCTCATC   GACATGGCCA   CGGCGCGCGG   CCTGTACGTG       660
ATCGTGGACT   GGCACATCCT   CACCCCGGGC   GATCCCCACT   ACAACCTGGA   CCGGGCCAAG       720
ACCTTCTTCG   CGGAAATCGC   CCAGCGCCAC   GCCAGCAAGA   CCAACGTGCT   CTACGAGATC       780
GCCAACGAAC   CCAACGGAGT   GAGCTGGGCC   TCCATCAAGA   GCTACGCCGA   AGAGGTCATC       840
CCGGTGATCC   GCCAGCGCGA   CCCCGACTCG   GTGATCATCG   TGGGCACCCG   CGGCTGGTCG       900
TCGCTCGGCG   TCTCCGAAGG   CTCCGGCCCC   GCCGAGATCG   CGGCCAACCC   GGTCAACGCC       960
TCCAACATCA   TGTACGCCTT   CCACTTCTAC   GCGGCCTCGC   ACCGCGACAA   CTACCTCAAC      1020
GCGCTGCGTG   AGGCCTCCGA   GCTGTTCCCG   GTCTTCGTCA   CCGAGTTCGG   CACCGAGACC      1080
TACACCGGTG   ACGGCGCCAA   CGACTTCCAG   ATGGCCGACC   GCTACATCGA   CCTGATGGCG      1140
GAACGGAAGA   TCGGGTGGAC   CAAGTGGAAC   TACTCGGACG   ACTTCCGTTC   CGGCGCGGTC      1200
TTCCAGCCGG   GCACCTGCGC   GTCCGGCGGC   CCGTGGAGCG   GTTCGTCGCT   GAAGGCGTCC      1260
GGACAGTGGG   TGCGGAGCAA   GCTCCAGTCC   TGA                                      1293
```

( 2 ) INFORMATION FOR SEQ ID NO:2:

( i ) SEQUENCE CHARACTERISTICS:
        ( A ) LENGTH: 430 amino acids
        ( B ) TYPE: amino acid
        ( C ) STRANDEDNESS: single
        ( D ) TOPOLOGY: linear ( x i ) SEQUENCE DESCRIPTION: SEQ ID NO:2:

```
Ala  Gly  Leu  Thr  Ala  Thr  Val  Thr  Lys  Glu  Ser  Ser  Trp  Asp  Asn  Gly
 1                   5                  10                      15

Tyr  Ser  Ala  Ser  Val  Thr  Val  Arg  Asn  Asp  Thr  Ser  Ser  Thr  Val  Ser
            20                      25                      30

Gln  Trp  Glu  Val  Val  Leu  Thr  Leu  Pro  Gly  Gly  Thr  Thr  Val  Ala  Gln
```

|    |    |    |    |    | 35 |    |    |    |    | 40 |    |    |    |    | 45 |    |    |
|----|----|----|----|----|----|----|----|----|----|----|----|----|----|----|----|----|----|

Val Trp Asn Ala Gln His Thr Ser Ser Gly Asn Ser His Thr Phe Thr
    50                          55              60

Gly Val Ser Trp Asn Ser Thr Ile Pro Pro Gly Gly Thr Ala Ser Phe
65                      70                  75                  80

Gly Phe Ile Ala Ser Gly Ser Gly Glu Pro Thr His Cys Thr Ile Asn
                85                  90                  95

Gly Ala Pro Cys Asp Glu Gly Ser Glu Pro Gly Gly Pro Gly Gly Pro
            100                 105                 110

Gly Thr Pro Ser Pro Asp Pro Gly Thr Gln Pro Gly Thr Gly Thr Pro
            115                 120                 125

Val Glu Arg Tyr Gly Lys Val Gln Val Cys Gly Ile Gln Leu Cys Asp
    130                 135                 140

Glu His Gly Asn Pro Val Gln Leu Arg Gly Met Ser Thr His Gly Ile
145                 150                 155                 160

Gln Trp Phe Asp His Cys Leu Thr Asp Ser Leu Asp Ala Leu Ala
                165                 170                 175

Tyr Asp Trp Lys Ala Asp Ile Ile Arg Leu Ser Met Tyr Ile Gln Glu
            180                 185                 190

Asp Gly Tyr Glu Thr Asn Pro Arg Gly Phe Thr Asp Arg Met His Gln
        195                 200                 205

Leu Ile Asp Met Ala Thr Ala Arg Gly Leu Tyr Val Ile Val Asp Trp
    210                 215                 220

His Ile Leu Thr Pro Gly Asp Pro His Tyr Asn Leu Asp Arg Ala Lys
225                 230                 235                 240

Thr Phe Phe Ala Glu Ile Ala Gln Arg His Ala Ser Lys Thr Asn Val
                245                 250                 255

Leu Tyr Glu Ile Ala Asn Glu Pro Asn Gly Val Ser Trp Ala Ser Ile
            260                 265                 270

Lys Ser Tyr Ala Glu Glu Val Ile Pro Val Ile Arg Gln Arg Asp Pro
        275                 280                 285

Asp Ser Val Ile Ile Val Gly Thr Arg Gly Trp Ser Ser Leu Gly Val
    290                 295                 300

Ser Glu Gly Ser Gly Pro Ala Glu Ile Ala Ala Asn Pro Val Asn Ala
305                 310                 315                 320

Ser Asn Ile Met Tyr Ala Phe His Phe Tyr Ala Ala Ser His Arg Asp
                325                 330                 335

Asn Tyr Leu Asn Ala Leu Arg Glu Ala Ser Glu Leu Phe Pro Val Phe
            340                 345                 350

Val Thr Glu Phe Gly Thr Glu Thr Tyr Thr Gly Asp Gly Ala Asn Asp
        355                 360                 365

Phe Gln Met Ala Asp Arg Tyr Ile Asp Leu Met Ala Glu Arg Lys Ile
    370                 375                 380

Gly Trp Thr Lys Trp Asn Tyr Ser Asp Phe Arg Ser Gly Ala Val
385                 390                 395                 400

Phe Gln Pro Gly Thr Cys Ala Ser Gly Gly Pro Trp Ser Gly Ser Ser
            405                 410                 415

Leu Lys Ala Ser Gly Gln Trp Val Arg Ser Lys Leu Gln Ser
            420                 425                 430

( 2 ) INFORMATION FOR SEQ ID NO:3:

( i ) SEQUENCE CHARACTERISTICS:
( A ) LENGTH: 42 base pairs
( B ) TYPE: nucleic acid -continued

```
    (C) STRANDEDNESS: single
    (D) TOPOLOGY: linear (xi) SEQUENCE DESCRIPTION: SEQ ID NO:3:

CCTCATTCTG  CAGCATCGGC  GGCCGGTCTC  ACCGCCACAG  TC                               4 2

(2) INFORMATION FOR SEQ ID NO:4:

(i) SEQUENCE CHARACTERISTICS:
        (A) LENGTH: 30 base pairs
        (B) TYPE: nucleic acid
        (C) STRANDEDNESS: single
        (D) TOPOLOGY: linear (xi) SEQUENCE DESCRIPTION: SEQ ID NO:4:

TTTGTTAACT  CAGGACTGGA  GCTTGCTCCG                                               3 0
```